US010392736B2

(12) United States Patent
Kongo

(10) Patent No.: US 10,392,736 B2
(45) Date of Patent: Aug. 27, 2019

(54) SEWING MACHINE, STITCHING PATTERN DISPLAY METHOD, AND RECORDING MEDIUM FOR STORING PROGRAM

(71) Applicant: Janome Sewing Machine Co., Ltd., Tokyo (JP)

(72) Inventor: Takeshi Kongo, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 277 days.

(21) Appl. No.: 15/489,202

(22) Filed: Apr. 17, 2017

(65) Prior Publication Data

US 2018/0010276 A1 Jan. 11, 2018

(30) Foreign Application Priority Data

Jul. 5, 2016 (JP) ................... 2016-133406

(51) Int. Cl.
*D05B 19/10* (2006.01)
*D05C 5/06* (2006.01)
*D05B 19/12* (2006.01)
*D05B 47/04* (2006.01)
*H04N 5/232* (2006.01)
*H04N 5/247* (2006.01)
*H04N 5/272* (2006.01)

(52) U.S. Cl.
CPC ............... *D05C 5/06* (2013.01); *D05B 19/10* (2013.01); *D05B 19/105* (2013.01); *D05B 19/12* (2013.01); *D05B 47/04* (2013.01); *H04N 5/23293* (2013.01); *H04N 5/247* (2013.01); *D05D 2205/16* (2013.01); *H04N 5/272* (2013.01)

(58) Field of Classification Search
CPC ........ D05B 19/105; D05C 5/06; H04N 5/272; H04N 5/247
See application file for complete search history.

(56) References Cited

U.S. PATENT DOCUMENTS

| 5,553,559 A | * | 9/1996 | Inoue ..................... D05B 19/08 |
| | | | 112/102.5 |
| 6,161,491 A | * | 12/2000 | Takenoya ............... D05B 19/02 |
| | | | 112/102.5 |
| 6,792,865 B2 | * | 9/2004 | Brunet-Manquat ......................... |
| | | | B41F 33/0036 |
| | | | 101/129 |

(Continued)

FOREIGN PATENT DOCUMENTS

| JP | 2010-184032 A | 8/2010 |
| JP | 2010-184033 A | 8/2010 |

*Primary Examiner* — Tajash D Patel
(74) *Attorney, Agent, or Firm* — Nakanishi IP Associates, LLC

(57) ABSTRACT

A sewing machine includes a first image acquisition unit, a second image acquisition unit, and a display unit. In the sewing machine, the first image acquisition performs image acquisition from the front face side of a cloth for a stitching pattern formed in the cloth. The second image acquisition unit performs image acquisition from the back face side of the cloth such that the center position of the acquired image matches the center position of the image of the stitching pattern acquired by the first image acquisition unit. The display unit displays, on the same screen, a first stitching pattern video image thus acquired by the first image acquisition unit and a second stitching pattern video image thus acquired by the second image acquisition unit.

14 Claims, 11 Drawing Sheets

(56) References Cited

U.S. PATENT DOCUMENTS

| | | | |
|---|---|---|---|
| 9,267,222 B2 * | 2/2016 | Schnaufer | D05B 19/12 |
| 9,650,734 B2 * | 5/2017 | Elliott | D05B 19/08 |
| 2013/0190916 A1 * | 7/2013 | Schnaufer | D05B 19/12 |
| | | | 700/137 |

* cited by examiner

SEWING MACHINE, STITCHING PATTERN DISPLAY METHOD, AND RECORDING MEDIUM FOR STORING PROGRAM

CROSS REFERENCE TO RELATED APPLICATIONS

This application is based on and claims the benefit of priority to Japanese Patent Application No. 2016-133406 filed on Jul. 5, 2016, the contents of which are hereby incorporated by reference in their entirety.

BACKGROUND OF INVENTION

Field of the Invention

The present invention relates to a sewing machine, a stitching pattern display method, and a recording medium for storing a program.

Description of the Related Art

Typically, sewing machines configured to perform a sewing operation (so as to form a stitching pattern) on a cloth to be sewn using an upper thread and a lower thread each include a thread tension balancing device arranged on an upper thread path in an arm unit in order to adjust the tension of the upper thread. Such an arrangement allows the user to operate the thread tension balancing device to adjust the thread tension balance, i.e., the tension balance between the upper thread and the lower thread, to be an optimum thread tension balance according to the kind of the cloth to be sewn. Thus, such an arrangement provides a high-quality sewing operation.

Also, another type of sewing machine has been disclosed, comprising: a feeding unit that feeds a cloth to be sewn; a stitching pattern forming unit that forms a stitching pattern of the upper thread and the lower thread in the form of an interlacing pattern in the cloth to be sewn in cooperation with the feeding operation of the feeding unit; and a thread tension balance adjustment unit that adjusts at least one of the tensions to be applied to the upper thread and the lower thread. The sewing machine further comprises: an image acquisition unit arranged at a position such that it is able to acquire an image of a stitching pattern formed in the cloth to be sewn, and configured to acquire an image of the stitching pattern from at least one side from among the front side and the back side of the cloth to be sewn; a region extraction unit configured to extract a region of a thread, which appears from the opposite side via an interlacing position between the upper thread and the lower thread, based on the image data of the stitching pattern acquired by the image acquisition unit; a calculation unit configured to calculate the area of the thread region extracted by the extraction unit; an estimation unit configured to estimate the thread tension balance, i.e., the tension balance between the upper thread and the lower thread, based on the area calculated by the calculation unit; and a control unit configured to control the thread tension balance adjustment unit so as to correct the thread tension balance for the stitching pattern formed by the stitching pattern forming unit, based on the estimation result obtained by the estimation unit (e.g., see Patent document 1).

RELATED ART DOCUMENTS

Patent Documents

[Patent Document 1]
Japanese Patent Application Laid-Open No. 2010-184033
The aforementioned technique has been proposed based on the fact that, when the upper thread and the lower thread are fed with an optimum thread tension balance, each interlacing position is formed in the vicinity of a center position along the thickness direction in the cloth to be sewn. Specifically, the area of the thread region is calculated, and the thread tension balance, i.e., the tension balance between the upper thread and the lower thread, is estimated based on the thread region area thus calculated. Also, in a case of performing image acquisition for both the front face and the back face of the cloth to be sewn, the tension balance can be estimated based on the difference in the thread region area between the front face and the back face of the cloth to be sewn. Also, it has been disclosed that, even in a case of performing image acquisition from only one side (e.g., from the upper side), by comparing a calculated thread region area with a reference thread region area (threshold value) prepared and stored beforehand, such an arrangement is capable of estimating the thread tension balance.

By calculating the difference in the thread region area between the upper thread and the lower thread, or otherwise between one from among the upper thread area and the lower thread area and a reference area prepared beforehand, such an arrangement is capable of estimating the thread tension balance regardless of the kind and the material of the cloth to be sewn, which is described in Patent document 1. However, sewing quality is also affected by the kind and the material of the cloth to be sewn, in addition to the thickness of the cloth to be sewn. Accordingly, there is a need to design the sewing quality, i.e., the thread tension balance, giving consideration to all the factors with respect to the cloth to be sewn. Thus, there is a demand for another approach.

SUMMARY OF THE INVENTION

Accordingly, the present invention has been made in order to address the aforementioned issue. Specifically, it is a purpose of the present invention to provide a sewing machine configured to display a stitching pattern balance between an upper thread and a lower thread in a manner that allows the user to easily make a judgment regarding the stitching pattern balance, a stitching pattern display method, and a recording medium for storing a computer program.

Embodiment (1)

One or more embodiments of the invention provide a sewing machine comprising: a first image acquisition unit that performs image acquisition from a front face side of a cloth for a stitching pattern formed in the cloth; a second image acquisition unit that performs image acquisition from a back face side of the cloth such that a center position of an acquired image matches a center position of an image of the stitching pattern acquired by the first image acquisition unit; and a display unit that displays, on a single screen, a first stitching pattern video image thus acquired by the first image acquisition unit and a second stitching pattern video image thus acquired by the second image acquisition unit.

Embodiment (2)

One or more embodiments of the invention provide the sewing machine. The display unit displays the first stitching pattern video image and the second stitching pattern video image in the form of a superimposed image.

Embodiment (3)

One or more embodiments of the invention provide the sewing machine. The display unit displays the first stitching pattern video image and the second stitching pattern video image such that they are side-by-side.

Embodiment (4)

One or more embodiments of the invention provide the sewing machine. The display unit displays a first mark at a position a predetermined distance away from a center position on the first stitching pattern video image. Furthermore, the display unit displays a second mark on the second stitching pattern video image such that it is defined by the same vector as the first mark extending from a center position of the second stitching pattern video image.

Embodiment (5)

One or more embodiments of the invention provide the sewing machine. The first mark and the second mark are each configured as a vertical line that is orthogonal to a sewing direction.

Embodiment (6)

One or more embodiments of the invention provide the sewing machine. The first mark and the second mark are each configured as a parallel line that is parallel to a sewing direction.

Embodiment (7)

One or more embodiments of the invention provide the sewing machine. The distance between the vertical line that is orthogonal to the sewing direction and the center position of the first stitching pattern video image or otherwise the second stitching pattern video image is set to an integer multiple of a setting value of a sewing feed amount.

Embodiment (8)

One or more embodiments of the invention provide the sewing machine. The distance between the parallel line that is parallel to the sewing direction and the center position of the first stitching pattern video image or otherwise the second stitching pattern video image is set to a setting value of a sewing swing width.

Embodiment (9)

One or more embodiments of the invention provide the sewing machine. The first mark and the second mark are configured as the vertical line that is orthogonal to the sewing direction and the line that is parallel to the sewing direction.

Embodiment (10)

One or more embodiments of the invention provide the sewing machine. When the sewing is set to an embroidery sewing mode, after embroidery sewing is suspended, the stitching pattern is subjected to image acquisition by the first image acquisition unit and the second image acquisition unit.

Embodiment (11)

One or more embodiments of the invention provide the sewing machine. After the embroidery sewing is suspended, the embroidery stitching pattern is moved such that perpendicular lines virtually extending from the embroidery stitching pattern respectively pass through the positions at which the first image acquisition unit and the second image acquisition unit are arranged.

Embodiment (12)

One or more embodiments of the invention provide the sewing machine. After one from among the first stitching pattern video image and the second stitching pattern video image is subjected to image reversal, the display unit displays the first stitching pattern video image and the second stitching pattern video image.

Embodiment (13)

One or more embodiments of the invention provide a stitching pattern display method employed by a sewing machine comprising a first image acquisition unit, a second image acquisition unit, and a display unit. The stitching pattern display method comprises: performing image acquisition by the first image acquisition unit from a front face side of a cloth for a stitching pattern formed in the cloth; performing image acquisition by the second image acquisition unit from a back face side of the cloth such that a center position of an acquired image matches a center position of an image of the stitching pattern acquired by the first image acquisition unit; and displaying, on a single screen, by the display unit, a first stitching pattern video image thus acquired by the first image acquisition unit and a second stitching pattern video image thus acquired by the second image acquisition unit.

Embodiment (14)

One or more embodiments of the invention provide a recording medium configured to store a program for instructing a sewing machine to execute a stitching pattern display method employed by the sewing machine, comprising a first image acquisition unit, a second image acquisition unit, and a display unit. The stitching pattern display method comprises: performing image acquisition by the first image acquisition unit from a front face side of a cloth for a stitching pattern formed in the cloth; performing image acquisition by the second image acquisition unit from a back face side of the cloth such that a center position of an acquired image matches a center position of an image of the stitching pattern acquired by the first image acquisition unit; and displaying, on a single screen, by the display unit, a first stitching pattern video image thus acquired by the first image acquisition unit and a second stitching pattern video image thus acquired by the second image acquisition unit.

With at least one embodiment according to the present invention, such an arrangement is capable of displaying the stitching pattern balance between the upper thread and the lower thread in a manner that allows the user to easily make a judgment.

DETAILED DESCRIPTION

Embodiment

Description will be made below with reference to FIGS. 1 through 9 regarding an embodiment according to the present invention.

[Configuration of Sewing Machine]

Figure 1:
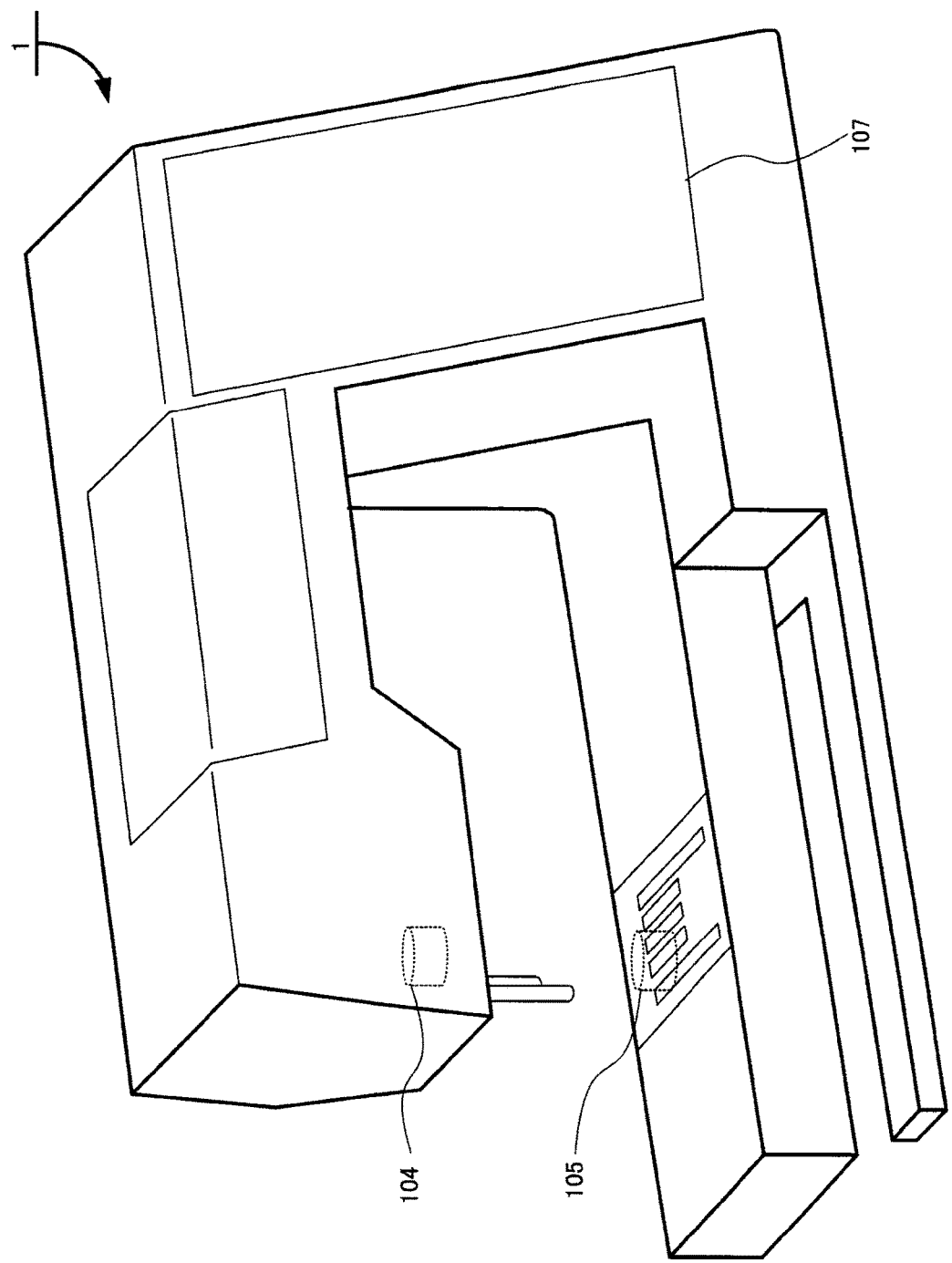
FIG. 1 is a diagram showing a configuration of a sewing machine according to an embodiment of the present invention.

As shown in FIG. 1, a sewing machine 1 according to the present embodiment includes a first image acquisition unit 104, a second image acquisition unit 105, and a display unit 107.

The first image acquisition unit 104 is arranged at a position that allows it to perform image acquisition for a stitching pattern formed in a cloth to be sewn along the advancing direction of the cloth to be sewn. The first image acquisition unit 104 performs video image acquisition for a stitching pattern of an upper thread from the front side of the cloth to be sewn (from the upper side). The second image acquisition unit 105 is arranged on the rear side of and below a needle plate. The second image acquisition unit 105 performs video image acquisition for a stitching pattern of a lower thread from the back face side of the cloth to be sewn (from the lower side) along the advancing direction of the cloth to be sewn. With such an arrangement, the first image acquisition unit 104 and the second image acquisition unit 105 are arranged such that they perform image acquisition for the same portion of the sewing pattern formed in the cloth. For example, the first image acquisition unit 104 and the second image acquisition unit 105 are arranged such that perpendicular lines virtually extending from the first image acquisition unit 104 and the second image acquisition unit 105 are aligned with the same position of a stitching pattern formed in the aforementioned cloth. In order to provide such an arrangement, the first image acquisition unit 104 and the second image acquisition unit 105 are arranged such that they are aligned with a perpendicular line virtually extending from a stitching pattern to be subjected to image acquisition. With such an arrangement, the first image acquisition unit 104 and the second image acquisition unit 105 are capable of performing image acquisition at the same time for a given portion of the stitching pattern formed in the cloth even if the cloth has a certain level of thickness. In a case in which the aforementioned arrangement cannot be employed due to the structure of the sewing machine, the video images thus acquired are preferably subjected to angular correction. Such an arrangement provides an effect of providing image acquisition that is almost equivalent to that provided by the aforementioned arrangement in which the first image acquisition unit 104 and the second image acquisition unit 105 are arranged such that they are aligned with a perpendicular line virtually extending from a stitching pattern to be subjected to image acquisition. It should be noted that, in a case in which the cloth has a non-negligible thickness, variation in the height of the stitching pattern or the like becomes an issue. However, by detecting the thickness of the cloth, and by performing the aforementioned angular correction giving consideration to the thickness of the cloth thus detected, such an arrangement is capable of solving such an issue.

The display unit 107 displays the stitching pattern video image acquired by the first image acquisition unit and the stitching pattern video image acquired by the second image acquisition unit on the same screen. Such a pair of stitching pattern video images are each displayed on the display unit 107 such that the stitching position that the perpendicular lines virtually extending from the first image acquisition unit 104 and the second image acquisition unit 105 pass through is positioned at the center position of the stitching pattern video image. Thus, such an arrangement allows the user to make an accurate comparison between the first stitching pattern video image and the second stitching pattern video image. Furthermore, by superimposing the first stitching pattern video image and the second stitching pattern video image, such an arrangement allows the user to judge by visual observation whether or not there is a difference between the first stitching pattern video image and the second stitching pattern video image.

Figure 2:
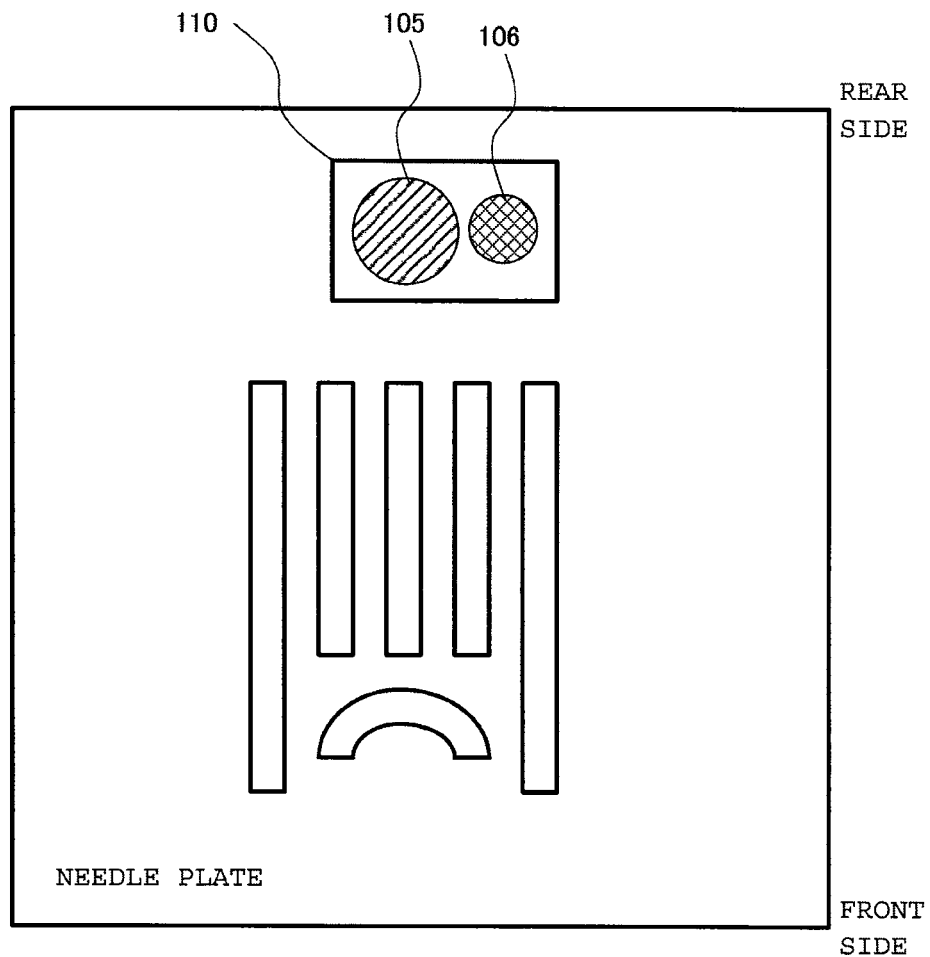
FIG. 2 is a diagram showing the layout of a second image acquisition unit and an illumination unit.

Furthermore, as shown in FIG. 2, an opening 110 is formed in a region on the rear side of the needle plate, for example. The image acquisition axis of the second image acquisition unit 105 crosses the region in which the opening 110 is formed. The second image acquisition unit 105 is arranged below the cloth to be sewn. Accordingly, an illumination unit 106 is provided in order to illuminate the opening 110 so as to allow the second image acquisition unit 105 to acquire a video image that allows a judgment to be made. The illumination unit 106 emits light only when video image acquisition is to be performed for the sewing pattern of the lower thread. It should be noted that there is only a small space in the vicinity of a region where the illumination unit 106 is to be arranged. Accordingly, the illumination unit 106 is preferably configured as a compact-sized illumination element such as an LED or the like. It should be noted that, in a case in which the upper thread is fed with a weak tension, in some cases, the upper thread is drawn to the back face of the cloth, leading to the thread protruding from the cloth. In this case, in some cases, a shadow of such a thread protrusion is generated on the side that is opposite to the illumination unit 106 across the thread protrusion illuminated by the illumination unit 106 arranged in the vicinity of the second image acquisition unit 105. By performing image acquisition for the shadow by the second image acquisition unit 105, such an arrangement enables estimation of the tension of the thread.

[Configuration of Sewing Machine]

Figure 3:
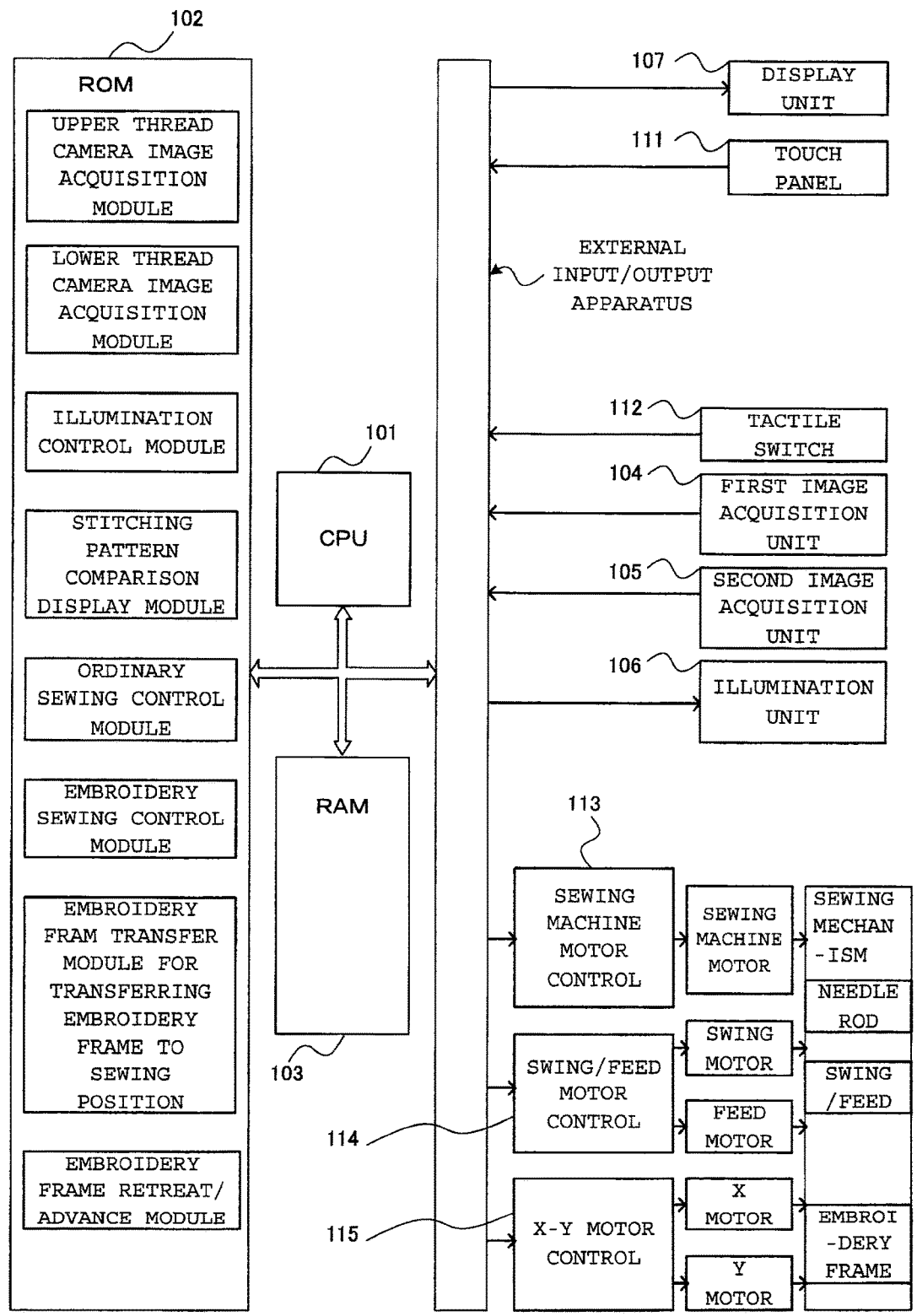
FIG. 3 is a diagram showing a schematic configuration of the sewing machine according to the embodiment of the present invention.

As shown in FIG. 3, the sewing machine 1 according to the present embodiment includes a CPU 101, ROM 102, RAM 103, the first image acquisition unit 104, the second image acquisition unit 105, the illumination unit 106, the display unit 107, a touch panel 111, a tactile switch 112, a sewing machine motor control apparatus 113, a swing/feed motor control apparatus 114, and an X-Y motor control apparatus 115.

The CPU 101 controls the overall operation of the sewing machine according to a control program. Furthermore, the CPU 101 is connected to various kinds of devices via an external input/output apparatus. The ROM 102 stores an upper thread camera image acquisition module, a lower thread camera image acquisition module, an illumination control module, a stitching pattern comparison module, an ordinary sewing control module, an embroidery sewing control module, an embroidery frame transfer module for transferring an embroidery frame to a stitching position, an embroidery frame retreat/advance module, and the like.

The RAM 103 stores a program module read out from the ROM 102. The display unit 107 is combined with the touch panel, which allows the user to select and edit a pattern and the like by a GUI, thereby allowing the user to operate the sewing machine 1. It should be noted that, with the present embodiment, the display unit 107 displays the stitching pattern video images of the upper thread and the lower thread in a real-time manner.

The tactile switch 112 is configured as a group of buttons which allows the user to instruct the sewing machine 1 to start or stop an operation of the sewing machine 1, to perform a backstitching operation, to perform a tacking operation, to move a needle rod in the vertical direction, to perform thread cutting, to perform automatic threading, and the like.

The sewing machine motor control apparatus 113 rotationally drives the sewing machine motor according to an instruction received from the CPU 101. This instructs the needle rod to move in the vertical direction, thereby forming a stitching pattern. The swing/feed motor control apparatus 114 drives a swing motor according to an instruction received from the CPU 101 so as to swing the needle rod, thereby providing a zig-zag operation of the needle rod. Furthermore, the swing/feed motor control apparatus 114 drives a feed motor according to an instruction received from the CPU 101 so as to control the feed amount and direction (forward direction or otherwise backward direction) for the cloth to be sewn. Furthermore, a sewing mechanism is controlled by the sewing machine motor and the swing/feed motor so as to form a straight line stitching pattern, a zig-zag stitching pattern, a design stitching pattern, or the like.

The X-Y motor control apparatus 115 drives an X motor and a Y motor according to an instruction received from the CPU 101, so as to move the embroidery frame of the sewing mechanism along the X direction or Y direction. Furthermore, each needle location point is determined according to instructions respectively transmitted to the X motor and the Y motor. Subsequently, an embroidery stitching pattern is formed by the vertical driving operation provided by the sewing machine motor, thereby providing a design stitching pattern. In particular, in the embroidery mode, such an arrangement provides a function of moving the embroidery frame for every stitch according to the embroidery data without forming a stitching pattern. Such an arrangement allows the sewing machine to execute an embroidery frame retreat operation and to execute an embroidery frame advance operation according to an instruction from the user.

It should be noted that, in the ordinary sewing mode, when the sewing start button of the tactile switch is pressed after the design is selected, the control operation is performed according to the "ordinary sewing control" module, which rotationally drives the sewing machine motor, thereby moving the needle in the vertical direction. When the needle is positioned on the upper side, the swing motor performs a driving operation so as to set the position of the needle along the swing direction. On the other hand, when the needle is positioned on the lower side, the feed motor performs a driving operation so as to set the next feed amount. As a result, a stitching pattern is formed. After such a sewing operation is performed for a length of 20 to 30 mm, the sewing pattern formed in the front face of the cloth to be sewn passes below an upper thread camera (first image acquisition unit 104), and the sewing pattern formed in the back face of the cloth to be sewn passes above a lower thread camera (second image acquisition unit 105). In this stage, video image acquisition is performed for the stitching pattern of the upper thread and the stitching pattern of the lower thread according to the "upper thread camera image acquisition" module and the "lower thread camera image acquisition" module. It should be noted that, when the lower thread camera (second image acquisition unit 105) starts image acquisition, the "lower thread illumination control" module is started up, which turns on the illumination. The video images of the upper thread and the lower thread thus acquired are displayed on the display unit 107 according to the "stitching pattern display" module. Such video images may be displayed side-by-side above and below or otherwise to the left and right of each other, thereby allowing the user to make a visual comparison.

On the other hand, in the embroidery sewing mode, when the sewing start button of the tactile switch is pressed after the design is selected, the sewing machine motor is rotationally driven, thereby moving the needle in the vertical direction. When the needle is positioned above the cloth to be sewn, the X-Y motor is driven so as to move the needle up to a needle location point indicated by the next embroidery data. Such an operation is repeatedly performed so as to form an embroidery stitching pattern. In this mode, there is a non-negligible distance between the region where a stitching pattern is to be formed and the region for which image acquisition is performed by the upper thread camera (first image acquisition unit 104) and the lower thread camera (second image acquisition unit 105). Accordingly, in the embroidery sewing mode, such an arrangement is not capable of performing real-time display of the video images of the stitching patterns acquired by the upper thread camera (first image acquisition unit 104) and the lower thread camera (second image acquisition unit 105). In order to acquire such video images, the user presses the stop button so as to temporarily suspend the sewing operation. Subsequently, the "embroidery frame transfer module for transferring the embroidery frame to the stitching position" is started up so as to transfer the embroidery frame according to a distance between the predetermined needle position and the camera position, such that the stitching pattern immediately formed is set to the camera position. Such an operation allows the video image of the upper thread stitching pattern and the video image of the lower thread stitching pattern to be displayed on the display unit 107. Furthermore, by transferring the embroidery frame in an offset state to each needle location point along the forward/backward direction according to the "embroidery frame retreat/advance" module, such an arrangement is capable of sequentially displaying each stitching state.

[Electrical Configuration of Sewing Machine]

Description will be made regarding an electrical configuration of the sewing machine according to the present embodiment. It should be noted that the components denoted by the same reference symbols as those shown in FIG. 3 have the same function. Accordingly, detailed description thereof will be omitted.

Figure 4:
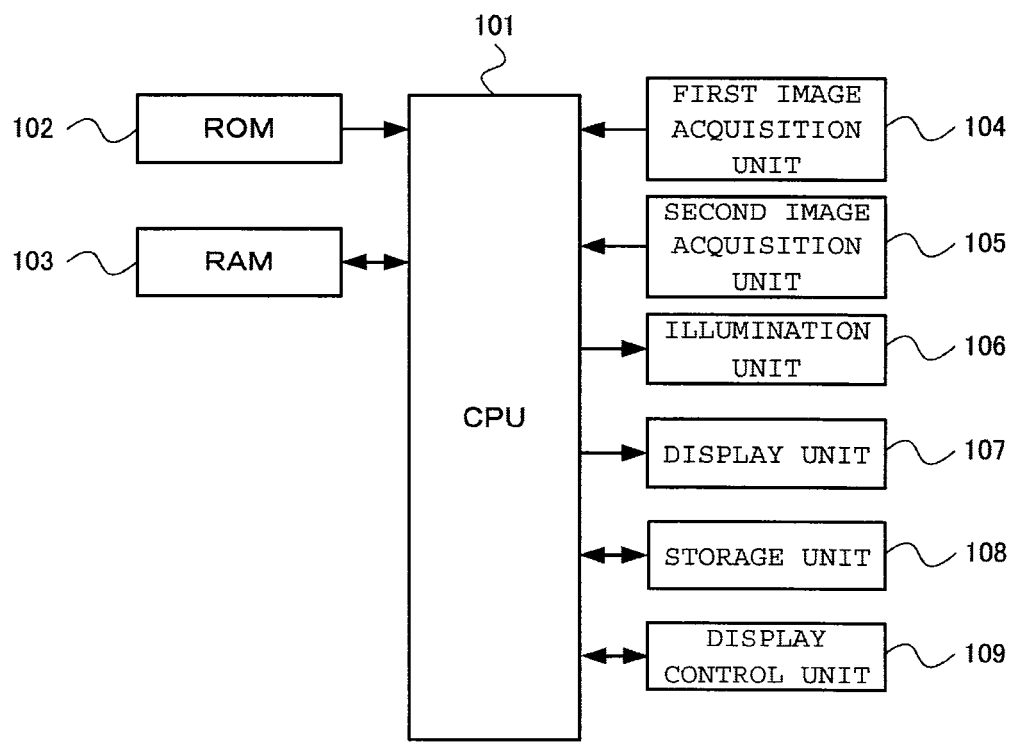
FIG. 4 is a diagram showing an electrical configuration of the sewing machine according to the embodiment of the present invention.

As shown in FIG. 4, the sewing machine according to the present embodiment has a configuration including the CPU 101, the ROM 102, the RAN 103, the first image acquisition unit 104, the second image acquisition unit 105, the illumination unit 106, the display unit 107, a storage unit 108, and a display control unit 109.

The storage unit 108 temporarily stores the stitching pattern video image data acquired by the first image acquisition unit 104 and the stitching pattern video image data acquired by the second image acquisition unit 105. Furthermore, image reversal is performed for one from among the stitching pattern video image data acquired by the first image acquisition unit 104 and the stitching pattern video image data acquired by the second image acquisition unit 105. The storage unit 108 stores the stitching pattern image data thus subjected to image reversal.

The display control unit 109 outputs display data to the display unit 107 so as to display the stitching pattern video image data acquired by the first image acquisition unit 104 and the stitching pattern video image data acquired by the second image acquisition unit 105 side-by-side above and below or otherwise to the left and right of each other on the same screen. Furthermore, the display control unit 109 outputs, to the display unit 107, display data including additional line data for displaying a sewing swing width such that it is superimposed on the stitching pattern video image data acquired by the first image acquisition unit 104 and stored in the storage unit 108 and the stitching pattern video image data acquired by the second image acquisition unit 105 and stored in the storage unit 108. Moreover, the display control unit 109 outputs, to the display unit 107, display data including additional line data for indicating a predetermined stitching position of the stitching pattern video image data acquired by the first image acquisition unit 104 and for indicating the corresponding stitching position of the stitching pattern video image data acquired by the second image acquisition unit 105. In addition, the display control unit 109 outputs, to the display unit 107, display data of a superimposed image obtained by superimposing the stitching pattern video image data thus subjected to image reversal on the other stitching video image data, which has not been subjected to image reversal.

[Display Manner of Display Unit]

Description will be made with reference to FIGS. 5 through 7 regarding a display manner employed in the display unit of the sewing machine according to the present embodiment.

Figure 5:
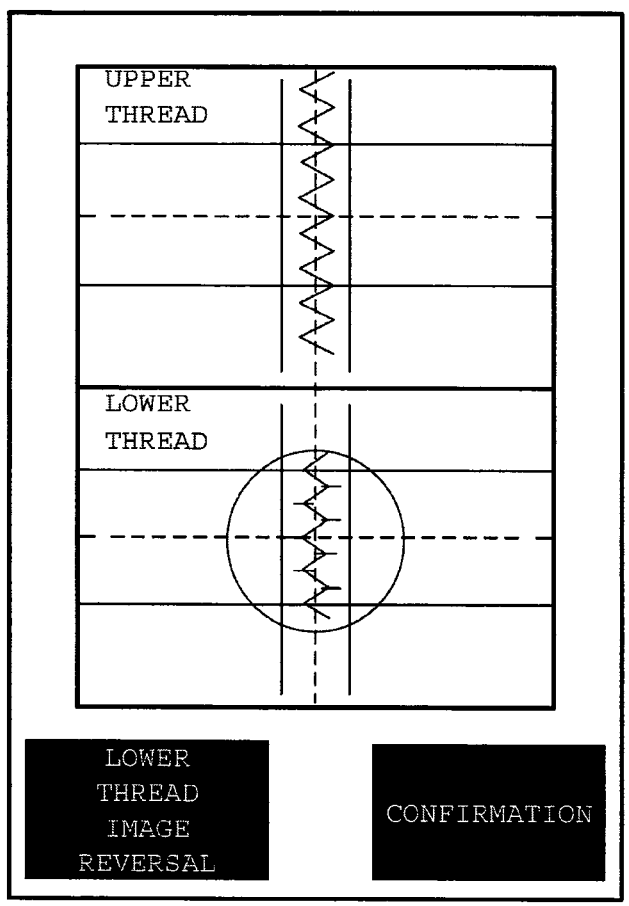
FIG. 5 is a diagram showing an example display manner for displaying an upper thread video image and a lower thread video image acquired by the sewing machine according to the embodiment of the present invention.

As shown in FIG. 5, the display unit 107 of the sewing machine 1 according to the present embodiment comprises a display screen split into two parts. With such an arrangement, a "lower thread image reversal" button and a "confirmation" button are arranged on the lower side of the display unit 107. In FIG. 5, the upper thread stitching pattern video image is displayed on the upper display screen of the display screen split into two parts. The lower thread stitching video image is displayed on the lower display screen. It should be noted that the display unit 107 may be configured as a screen split into two parts arranged along the horizontal direction.

Furthermore, a vertical dotted line that indicates the center of the swing and a horizontal dotted line that indicates a reference position along the feed direction are displayed on both the upper thread stitching pattern video image and the lower thread stitching pattern video image displayed on the display screen split into two parts. The intersection between them matches the center of the corresponding display screen. Furthermore, given marks are displayed a predetermined distance away from the center of the corresponding display screen. In the drawing, a pair of vertical lines are displayed in parallel with the vertical dotted line. The width between the dotted line and each of the two vertical lines may be set as desired. For example, such a width may represent the sewing swing width. Specifically, the actual sewing swing width is 9 mm. By displaying such lines together with the upper thread stitching pattern image and the lower thread stitching pattern image on the display unit 107, such an arrangement allows the user to easily make a comparison between the upper thread stitching pattern and the lower thread stitching pattern. In particular, with such an arrangement in which such a sewing swing width is displayed, when either thread is fed with an inappropriate tension, either the upper thread sewing swing or the lower thread sewing swing do not reach the vertical lines. Thus, such an arrangement allows the user to easily understand an issue due to the thread tension simply by judgment by sight.

Furthermore, another pair of lines are displayed in parallel with the horizontal dotted line, as marks positioned along the feed direction. Each of the parallel lines may be displayed a desired width away from the horizontal dotted line. The width may be set to the sewing feed amount or an integer multiple of the sewing feed amount. In the drawing, the two lines are respectively displayed 5 mm away from and in parallel with the horizontal dotted line along the vertical direction. Only the vertical lines may be displayed. Also, only the horizontal lines may be displayed. Also, both the horizontal lines and the vertical lines may be displayed, thereby displaying a grid region. Also, as such a mark, instead of such lines, dots or other kinds of shapes may be displayed for indicating a given point or a given region. It should be noted that there is a need to arrange each pair of the corresponding marks along the same direction the same distance away from the center of the respective screens of the display unit 107 that display the upper thread stitching pattern and the lower thread stitching pattern. That is to say, the same mark is displayed on each of the upper thread stitching pattern video image and the lower thread stitching pattern video image such that they are positioned with the same vector with respect to the center of the corresponding video image on the display unit 107 that displays the upper thread stitching pattern and the lower thread stitching pattern. Furthermore, as shown in FIG. 5, the upper thread needle location point and the lower thread needle location point that are closest to the reference position along the feed direction correspond to the same needle location point in the video images. Moreover, the intersection between the vertical dotted line and the horizontal dotted line on the upper thread display screen and the intersection between them on the lower thread display screen both indicate the same position (on the front face and the back face) as viewed from the upper side and the lower side of the cloth.

For example, in an example shown in FIG. 5, the upper thread is fed with an insufficient tension. In this case, the upper thread is slightly drawn to the back side. As a result, in the video image, the lower thread zig-zag pattern has a small width. FIG. 7 is an enlarged view of the lower thread pattern. The lower thread pattern is formed with a swing width that is smaller than that of the upper thread pattern due to the upper thread being drawn to the back side. Furthermore, in this case, the angle defined by the zig-zag pattern of the lower thread becomes larger in the vicinity of the needle location point according to the reduced swing width. In order to address such an issue, the user rotates a thread tension balance adjustment dial so as to raise the tension applied to the upper thread. In this case, the lower thread is drawn upward. Such an arrangement allows the user to perform adjustment such that the upper thread zig-zag pattern and the lower thread zig-zag pattern have the same width. In this stage, the angle defined by the zig-zag pattern in the vicinity of the needle location point becomes the same for the upper thread pattern and the lower thread pattern.

In the embroidery operation, when the upper thread is drawn downward such that it slightly protrudes from the back face of the cloth, judgement is made that the embroidery condition has been appropriately adjusted. Conversely, when the lower thread (typically having a white color) has been detected on the front face of the cloth, judgment is made that the upper thread has been fed with an excessive tension.

Figure 6:
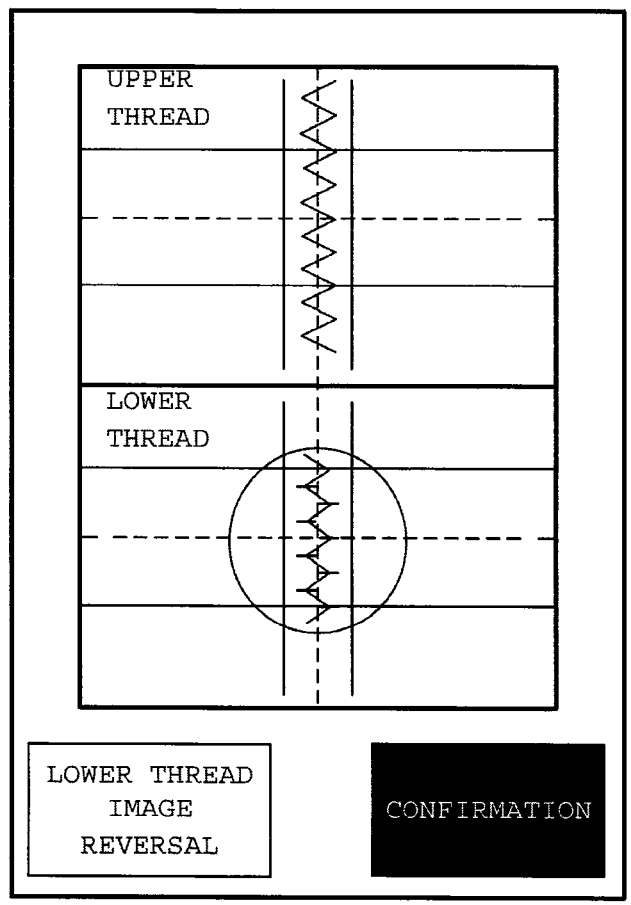
FIG. 6 is a diagram showing an example display manner for displaying an upper thread video image and a lower thread video image acquired by the sewing machine according to the embodiment of the present invention.
Figure 7:
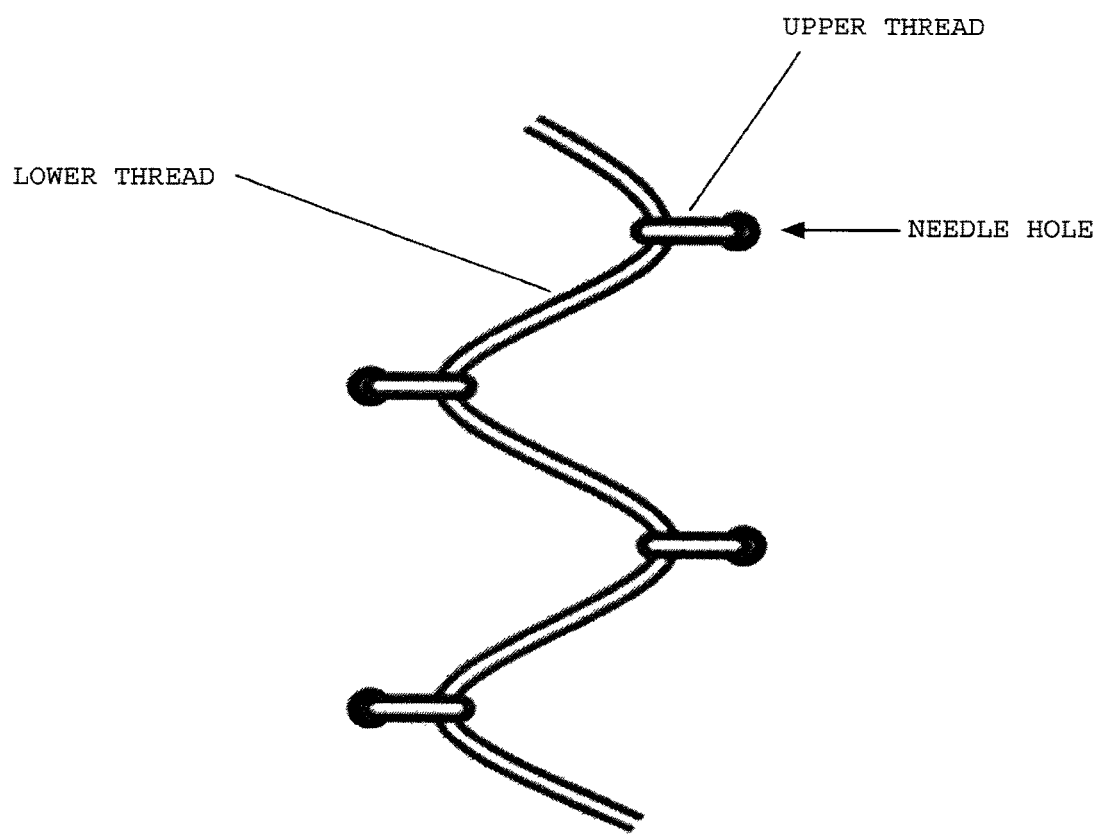
FIG. 7 is an enlarged view of the lower thread stitching pattern formed by the sewing machine according to the embodiment of the present invention.
Figure 8:
FIG. 8 is an enlarged view of the lower thread stitching pattern formed when sewing is performed along a straight line by the sewing machine according to the embodiment of the present invention.

FIG. 8 shows a lower thread stitching pattern when sewing is performed along a straight line rather than the zig-zag stitching pattern as shown in FIGS. 5 through 7. As shown in FIG. 8, even if the sewing is performed without swinging, a judgment can be made based on the appearance by making a comparison between the thread feed amount for the upper thread and that for the lower thread. That is to say, when the upper thread has been fed with an insufficient tension, the upper thread is drawn up to the back face of the cloth. In this case, the lower thread is covered by the drawn-up upper thread. As a result, the lower thread stitching region can be seen to be short. Accordingly, such a judgment is made based on the thread sewing regions (lengths) of the upper thread and the lower thread as viewed from the upper side and the lower side of the cloth. Specifically, when the upper thread has been fed with an insufficient tension, the sewing length of the upper thread matches a setting value on the front face of the cloth, but the sewing length of the lower thread can be seen to be smaller than the setting value on the back face of the cloth. Conversely, when the upper thread has been fed with an excessive tension, the lower thread protrudes from the front face of the cloth. As a result, the sewing length of the upper thread can be seen to be smaller than the setting value on the front face of the cloth. In this case, according to the aforementioned mechanism, the sewing length of the lower thread matches the setting value on the back face of the cloth. By solving such an issue due to the tension applied to a given thread by the thread tension balance adjustment device, such an arrangement is capable of setting both the sewing length of the upper thread on the front face of the cloth and the sewing length of the lower thread on the back face of the cloth to the same setting value. Thus, by making a comparison between the sewing length of the upper thread on the front face of the cloth and the sewing length of the lower thread on the back face of the cloth, such an arrangement enables a judgment to be made regarding whether or not the upper thread and the lower thread have been fed with an appropriate tension. It should be noted that the stitching patterns of the upper thread and the lower thread are displayed such that the center position of each stitching pattern is positioned at the center of the corresponding image on the display unit that displays the stitching patterns of the upper thread and the lower thread. Such an arrangement allows the user to easily make the aforementioned judgement. In particular, by displaying marks that each indicate an integer multiple of the sewing feed amount along the sewing feed direction, such an arrangement allows the user to more easily make a judgment with respect to the tension applied to each thread.

It should be noted that the upper thread stitching pattern and the lower thread stitching pattern overlap. In some cases, a protrusion occurs in such an overlapping portion as compared with the other portions. In some cases, a shadow of such a protrusion occurs on the side that is opposite to the illumination unit 106 across the protrusion. By acquiring such a shadow image by the second image acquisition unit 105, such an arrangement is capable of enabling a judgement to be made regarding the tension of each thread. In particular, in a case in which the upper thread and the lower thread have the same color, such a judgment method is effectively employed.

The upper thread stitching pattern image and the thread stitching pattern image are acquired from mutually opposing sides. Accordingly, in FIG. 5, the upper thread stitching pattern has a shape that is the reverse of that of the lower thread stitching pattern. When the "lower thread image reversal" button is pressed in this state, as shown in FIG. 6, the video image of the lower thread stitching pattern is displayed in an image reversal mode. Such a function allows the user to monitor a virtual video image of the lower thread stitching pattern as if it had been acquired as viewed from the front face side of the cloth to be sewn.

Figure 9:
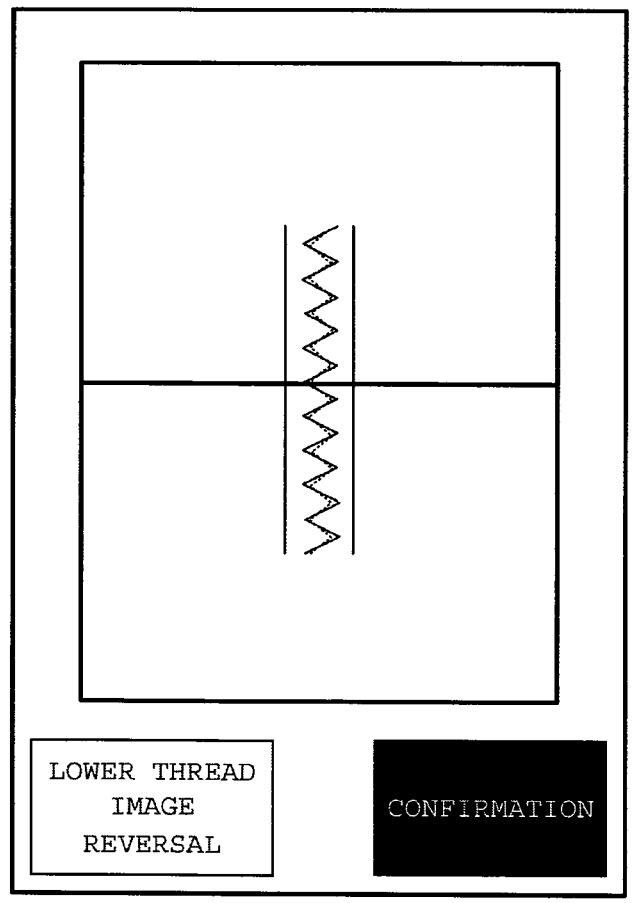
FIG. 9 is a diagram showing an example display manner for displaying an upper thread video image and a lower thread video image acquired by the sewing machine according to the embodiment of the present invention.

Furthermore, as shown in FIG. 9, the display unit 107 may display a superimposed image obtained by superimposing the upper thread stitching pattern video image and the lower thread stitching pattern video image that has been subjected to the image reversal. Also, the display unit 107 may display a superimposed image obtained by superimposing an ideal reference image of the upper thread stitching pattern and the lower thread stitching pattern video image that has been subjected to the image reversal. In any of the aforementioned display manners, such an arrangement allows the user to easily make a comparison between the upper thread stitching pattern video image and the lower thread stitching pattern video image. Thus, such an arrangement allows the user to adjust the thread tension balance adjustment dial with high precision based on the comparison result thus obtained as a reference value.

[Operation in Ordinary Sewing Mode]

Figure 10:
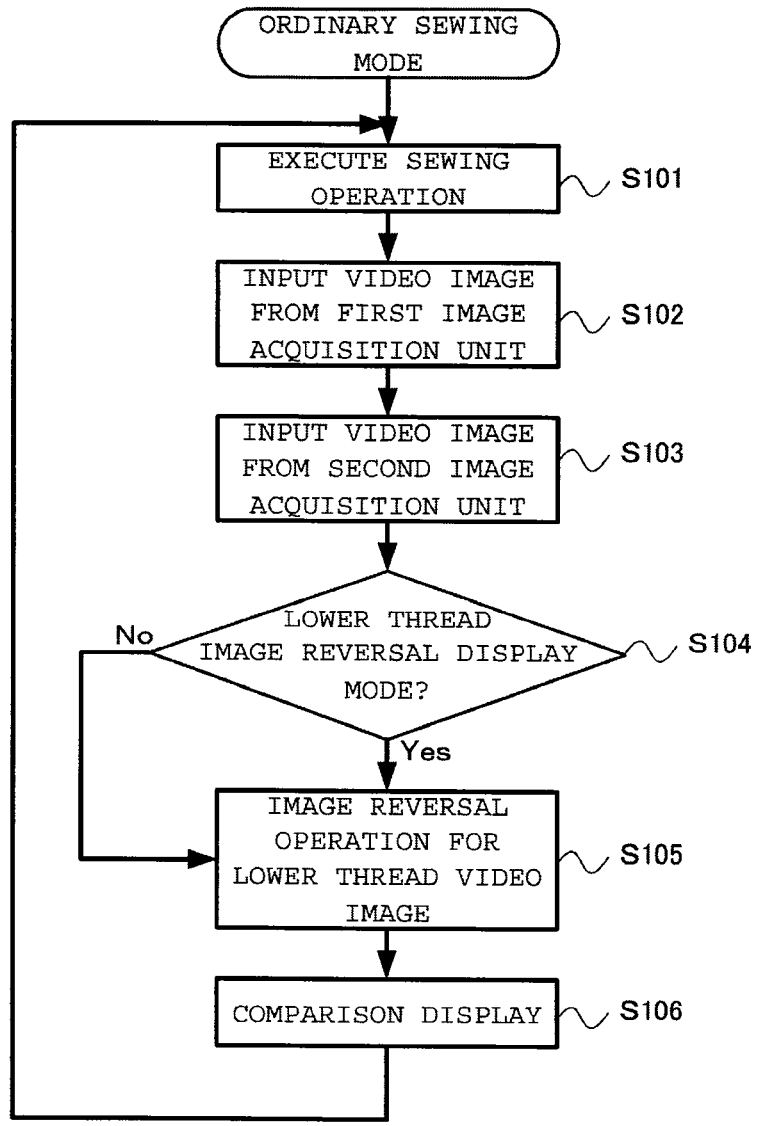
FIG. 10 is a flowchart showing an operation of the sewing machine in an ordinary sewing mode according to the embodiment of the present invention.

Description will be made with reference to FIG. 10 regarding the operation of the sewing machine in the ordinary sewing mode according to the present embodiment.

After the sewing machine 1 is set to the ordinary sewing mode, a stitching pattern is selected from among a straight line stitching pattern, a zig-zag stitching pattern, a design stitching pattern, and the like, and the sewing operation is executed (Step S101). Next, the upper thread stitching pattern video image is input from the first image acquisition unit 104 (Step S102). Furthermore, the lower thread stitching pattern video image is input from the second image acquisition unit 105 (Step S103).

In this stage, when the image reversal display mode is applied to the lower thread stitching pattern video image ("YES" in Step S104), the lower thread stitching pattern video image is reversed horizontally, so as to generate video data of the lower thread as if it had been acquired as viewed from the front face side of the cloth to be sewn (Step S105).

Subsequently, the upper thread stitching pattern video image and the lower thread stitching pattern video image are displayed side-by-side so as to allow the user to make a comparison between them (Step S106). After the sewing operation is performed for a length of 20 to 30 mm in the advancing direction, each stitching pattern reaches the corresponding camera position. In this stage, such an arrangement allows the user to monitor the acquired stitching pattern video images in a real-time manner.

[Operation in Embroidery Mode]

Figure 11:
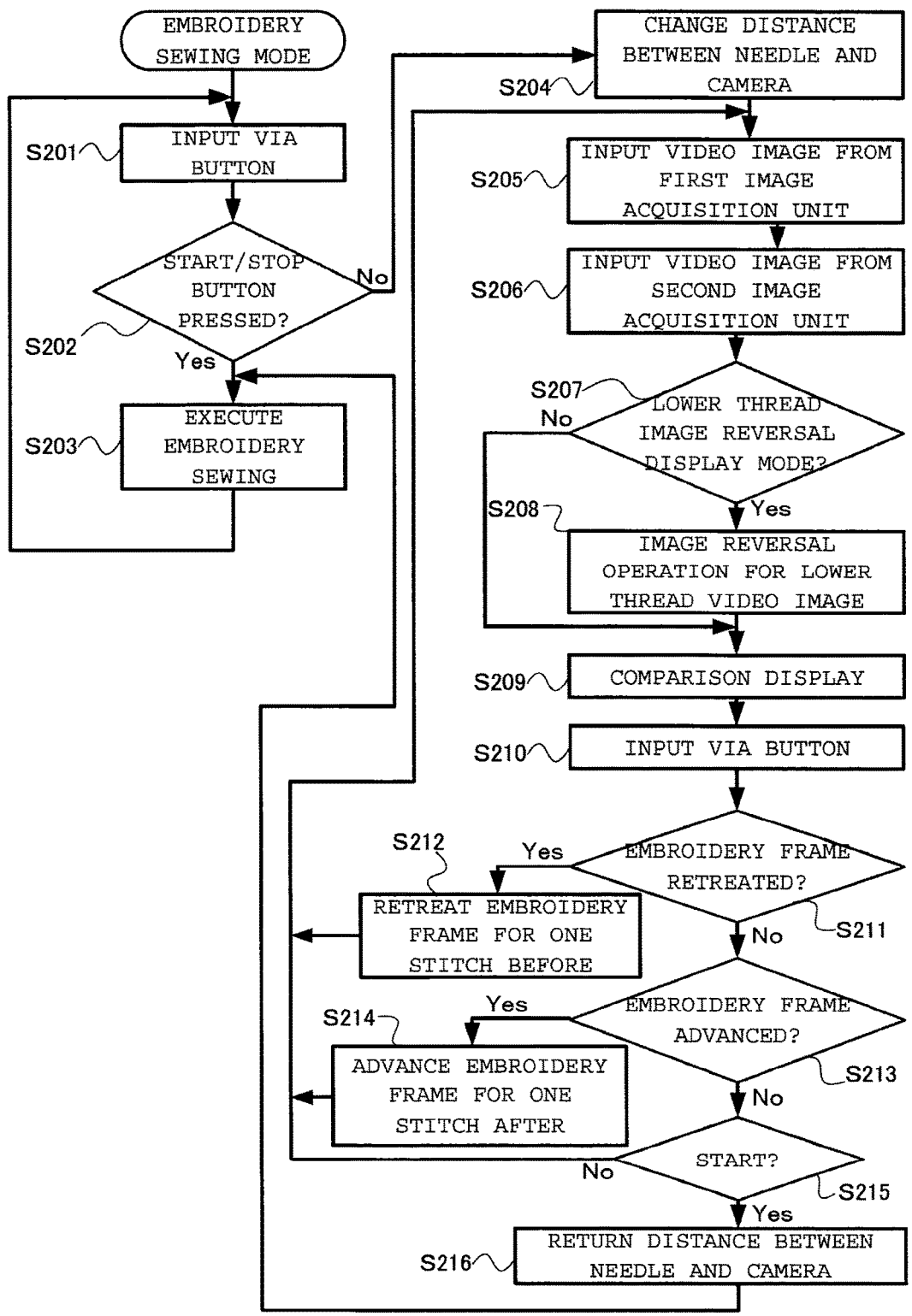
FIG. 11 is a flowchart showing an operation of the sewing machine in an embroidery sewing mode according to the embodiment of the present invention.

Description will be made with reference to FIG. 11 regarding the operation of the sewing machine in the embroidery mode according to the present embodiment.

An embroidery frame is mounted on the sewing machine 1, and the sewing machine 1 is set to the embroidery sewing mode. The user selects a design by pressing the corresponding button. After the user performs an editing operation such as position adjustment, size adjustment, rotation, or the like (Step S201), the user presses the "start" button in the form of a tactile switch. The sewing machine 1 interprets the user's instruction ("YES" in Step S202), and the sewing machine starts an embroidery sewing operation (Step S203).

In the execution of the embroidery sewing, such an arrangement displays the video images acquired by neither the upper thread camera (first image acquisition unit 104) nor the lower thread camera (second image acquisition unit 105). When the operation button thus pressed matches the "stop" button, the sewing machine temporarily suspends the embroidery sewing execution ("NO" in Step S202).

After the sewing machine 1 temporarily suspends the sewing operation, the embroidery frame is moved according to a distance between the needle position and the image acquisition position of the first image acquisition unit 104 and the second image acquisition unit 105. This aligns the camera image acquisition position with the position of the stitching pattern formed in the immediately previous step (Step S204). In this stage, the upper thread camera (first image acquisition unit 104) acquires the video image of the stitching pattern on the front face of the cloth to be sewn (Step S205). Furthermore, the lower thread camera (second image acquisition unit 105) acquires the video image of the stitching pattern on the back face of the cloth to be sewn (Step S206).

When the image reversal display mode is applied to the lower thread stitching video image ("YES" in Step S207), the lower thread stitching pattern video image is reversed horizontally, so as to generate the video image data as if it had been acquired from the front face side of the cloth to be sewn (Step S208). Subsequently, the upper thread stitching pattern video image and the lower thread stitching pattern video image are displayed side-by-side so as to allow the user to make a comparison between them (Step S209).

When the user presses any tactile switch (Step S210), the sewing machine 1 judges whether or not the tactile switch thus pressed matches the "embroidery frame retreat" button (Step S211). When the tactile switch thus pressed matches the "embroidery frame retreat" button ("YES" in Step S211), the embroidery frame is returned to the stitching pattern position for one stitch before (Step S212). Subsequently, the operations represented by Steps S205 through S208 are executed in which image acquisition is performed for the upper thread stitching pattern and the lower thread stitching pattern, and the acquired image data is edited. In Step S209, comparison display is performed for the upper thread stitching pattern and the lower thread stitching pattern.

When the tactile switch thus pressed does not match the "embroidery frame retreat" button ("NO" in Step S211), judgment is made whether or not the tactile switch thus pressed matches the "embroidery frame advance" button (Step S213). When the tactile switch thus pressed matches the "embroidery frame advance" button ("YES" in Step S213), the embroidery frame is advanced to the stitching pattern position for one stitch after (Step S214). Subsequently, the operations represented by Steps S205 through S208 are executed in which image acquisition is performed for the upper thread stitching pattern and the lower thread stitching pattern, and the acquired image data is edited. In Step S209, comparison display is performed for the upper thread stitching pattern and the lower thread stitching pattern.

When the tactile switch thus pressed does not match the "embroidery frame advance" button ("NO" in Step S213), judgment is made whether or not the tactile switch thus pressed matches the "start" button (Step S215). When the tactile switch thus pressed matches the "start" button ("YES" in Step S215), the distance between the needle and the camera is returned (Step S216), and the flow returns to Step S203 in which the embroidery sewing is restarted. When the tactile switch thus pressed does not match the "start" button ("NO" in Step S215), the flow returns to Step S205 in which the image acquisition operation is continued.

As described above, with the present embodiment, the first image acquisition unit is arranged at a position that allows it to acquire an image of a stitching pattern formed in a cloth to be sewn along the advancing direction of the cloth to be sewn. The first image acquisition unit acquires the stitching pattern video image from the front face side of the cloth to be sewn. Furthermore, the second image acquisition unit is arranged on the rear side of and below the needle plate. The second image acquisition unit acquires the stitching pattern video image from the back face side of the cloth to be sewn along the advancing direction of the cloth to be sewn. The display unit displays the stitching pattern video image acquired by the first image acquisition unit and the stitching pattern video image acquired by the second image acquisition unit on the same screen. Thus, such an arrangement allows the user to monitor the upper thread stitching pattern video image and the lower thread stitching pattern video image in a real-time manner. This allows the user to easily make a judgment by sight so as to adjust the thread tension balance in a real-time manner while viewing the video image displayed on the display unit.

With such an arrangement, the storage unit temporarily stores the stitching pattern video image data acquired by the first image acquisition unit and the stitching pattern video image data acquired by the second image acquisition unit. Furthermore, the display control unit outputs the display data to the display unit so as to allow the display unit to display the stitching pattern video image data acquired by the first image acquisition unit and the stitching pattern video image data acquired by the second image acquisition unit side-by-side above and below or otherwise to the left and right of each other on the same screen. Such an arrangement allows the user to easily make a comparison between the upper thread stitching pattern video image and the lower thread stitching pattern video image. Thus, such an arrangement allows the user to accurately adjust the thread tension balance.

Furthermore, the display control unit outputs, to the display unit, the display data including the additional line data for displaying the sewing swing width such that it is superimposed on the stitching pattern video image data acquired by the first image acquisition unit and stored in the storage unit and the stitching pattern video image data acquired by the second image acquisition unit and stored in the storage unit. This allows the user to easily make a comparison of the swing width between the upper thread stitching pattern and the lower thread stitching pattern. Thus, such an arrangement allows the user to accurately adjust the thread tension balance.

Moreover, the display control unit outputs, to the display unit, the display data including the additional line data for indicating a predetermined sewing pattern position on the stitching pattern video image data acquired by the first image acquisition unit and for indicating the corresponding sewing pattern position on the stitching pattern video image data acquired by the second image acquisition unit. This allows the user to easily make a comparison between the upper thread stitching pattern and the corresponding lower thread stitching pattern. Thus, such an arrangement allows the user to accurately adjust the thread tension balance.

After one from among the stitching pattern video image data acquired by the first image acquisition unit and the stitching pattern video image data acquired by the second image acquisition unit is subjected to image reversal, the data of both of the stitching pattern video images are stored in the storage unit. The display control unit outputs the display data to the display unit such that the stitching pattern video images stored in the storage unit are displayed side-by-side above and below or otherwise to the left and right of each other on the same screen. This allows the user to easily make a comparison between the upper thread stitching pattern video image and the lower thread stitching pattern video image without concern for the mirror-image relation between them. Thus, such an arrangement allows the user to accurately adjust the thread tension balance.

After one from among the stitching pattern video image data acquired by the first image acquisition unit and the stitching pattern video image data acquired by the second image acquisition unit is subjected to image reversal, the data of both of the stitching pattern video images are stored in the storage unit. Furthermore, the display control unit outputs, to the display unit, the display data including the additional line data for displaying the sewing swing width such that it is superimposed on the stitching pattern video image data stored in the storage unit. This allows the user to easily make a comparison of the sewing swing width between the upper thread stitching pattern and the lower thread stitching pattern. Thus, such an arrangement allows the user to accurately adjust the thread tension balance.

After one from among the stitching pattern video image data acquired by the first image acquisition unit and the stitching pattern video image data acquired by the second image acquisition unit is subjected to image reversal, the data of both of the stitching pattern video images are stored in the storage unit. Furthermore, the display control unit outputs, to the display unit, the display data including the additional line data for indicating a predetermined sewing pattern position on the stitching pattern video image data acquired by the first image acquisition unit and for indicating the corresponding sewing pattern position on the stitching pattern video image data acquired by the second image acquisition unit. This allows the user to easily make a comparison between the upper thread stitching pattern and the lower thread stitching pattern. Thus, such an arrangement allows the user to accurately adjust the thread tension balance.

After one from among the stitching pattern video image data acquired by the first image acquisition unit and the stitching pattern video image data acquired by the second image acquisition unit is subjected to image reversal, the data of both of the stitching pattern video images are stored in the storage unit. Furthermore, the display control unit outputs, to the display unit, additional line data for indicating a sewing swing width such that it is superimposed on the stitching pattern video images stored in the storage unit, and additional line data for indicating a predetermined sewing pattern position on the stitching pattern video image data acquired by the first image acquisition unit and for indicating the corresponding sewing pattern position on the stitching pattern video image data acquired by the second image acquisition unit. This allows the user to easily make a comparison between the upper thread stitching pattern and the lower thread stitching pattern. Thus, such an arrangement allows the user to accurately adjust the thread tension balance with high precision.

After one from among the stitching pattern video image data acquired by the first image acquisition unit and the stitching pattern video image data acquired by the second image acquisition unit is subjected to image reversal, the data of both of the stitching pattern video images are stored in the storage unit. Furthermore, the display control unit outputs display data configured as superimposed image data comprising the stitching pattern video image data thus subjected to the image reversal and the other stitching pattern video image data that has not been subjected to image reversal both of which are stored in the storage unit. This allows the user to easily make a comparison between the upper thread stitching pattern and the lower thread stitching pattern. Thus, such an arrangement allows the user to accurately adjust the thread tension balance.

It should be noted that the operation of the sewing machine may be recorded on a computer-system-readable or computer-readable recording medium in the form of a program. Also, such a program thus recorded on the recording medium may be read out and executed by the sewing machine, thereby providing the sewing machine according to the present invention. Examples of such a computer system or computer as used here include an operating system and a hardware component such as peripheral devices or the like.

Also, the "computer system" or "computer" encompasses website providing environments (or display environments) that employ the WWW (World Wide Web) system. Also, the aforementioned program may be transmitted to other computer systems or computers from a given computer system or computer that stores this program in its storage apparatus or the like via a transmission medium or otherwise transmission waves in the transmission medium. The "transmission medium" as used here to transmit a program represents a medium having a function of transmitting information, examples of which include networks (communication networks) such as the Internet and communication lines (communication wires) such as phone lines, etc.

Also, the aforementioned program may be configured to provide a part of the aforementioned function. Also, the aforementioned program may be configured as a so-called differential file (differential program), which is to be combined with a different program stored beforehand in a computer system or a computer in order to provide the aforementioned function.

Detailed description has been made with reference to the drawings regarding the embodiment according to the present invention. However, such a specific configuration is not restricted to the embodiment. Rather, various kinds of changes in design or the like may be made without departing from the scope of the present invention.

REFERENCE SIGNS LIST 1 sewing machine
101 CPU
102 ROM
103 RAM
104 first image acquisition unit
105 second image acquisition unit
106 illumination unit
107 display unit
108 storage unit
109 display control unit
110 opening
111 touch panel
112 tactile switch
113 sewing machine motor control apparatus
114 swing/feed motor control apparatus
115 X-Y motor control apparatus.

What is claimed is:

1. A sewing machine comprising:
   a first image acquisition unit that performs image acquisition from a front face side of a cloth, so as to acquire a first stitching pattern video image including an image of a stitching pattern appearing on the front face of the cloth, the image of the stitching pattern being at a center position of the first stitching pattern video image;
   a second image acquisition unit that performs image acquisition from a back face side of the cloth, so as to acquire a second stitching pattern video image including a part of the back face side corresponding to the stitching pattern appearing on the front face of the cloth, the part being at a center position of the second stitching pattern video image; and
   a display unit that displays, on a single screen, the first stitching pattern video image thus acquired by the first image acquisition unit and the second stitching pattern video image thus acquired by the second image acquisition unit.

2. The sewing machine according to claim 1, wherein the display unit displays the first stitching pattern video image and the second stitching pattern video image in the form of a superimposed image.

3. The sewing machine according to claim 1, wherein the display unit displays the first stitching pattern video image and the second stitching pattern video image such that they are side-by-side.

4. The sewing machine according to claim 1, wherein the display unit displays a first mark at a position a predetermined distance away from a center position on the first stitching pattern video image,
   and wherein the display unit displays a second mark on the second stitching pattern video image such that it is defined by the same vector as the first mark extending from a center position of the second stitching pattern video image.

5. The sewing machine according to claim 4, wherein the first mark and the second mark are each configured as a vertical line that is orthogonal to a sewing direction.

6. The sewing machine according to claim 4, wherein the first mark and the second mark are each configured as a parallel line that is parallel to a sewing direction.

7. The sewing machine according to claim 5, wherein a distance between the vertical line that is orthogonal to the sewing direction and the center position of the first stitching pattern video image or otherwise the second stitching pattern video image is set to an integer multiple of a setting value of a sewing feed amount.

8. The sewing machine according to claim 6, wherein a distance between the parallel line that is parallel to the sewing direction and the center position of the first stitching pattern video image or otherwise the second stitching pattern video image is set to a setting value of a sewing swing width.

9. The sewing machine according to claim 4, wherein the first mark and the second mark are configured as the vertical line that is orthogonal to the sewing direction and the line that is parallel to the sewing direction.

10. The sewing machine according to claim 1, wherein, when the sewing is set to an embroidery sewing mode, after embroidery sewing is suspended, the stitching pattern is subjected to image acquisition by the first image acquisition unit and the second image acquisition unit.

11. The sewing machine according to claim 10, wherein, after the embroidery sewing is suspended, the embroidery stitching pattern is moved such that perpendicular lines virtually extending from the embroidery stitching pattern respectively pass through the positions at which the first image acquisition unit and the second image acquisition unit are arranged.

12. The sewing machine according to claim 1, wherein, after one from among the first stitching pattern video image and the second stitching pattern video image is subjected to image reversal, the display unit displays the first stitching pattern video image and the second stitching pattern video image.

13. A stitching pattern display method employed by a sewing machine comprising a first image acquisition unit, a second image acquisition unit, and a display unit, the stitching pattern display method comprising:
   performing image acquisition by the first image acquisition unit from a front face side of a cloth, so as to acquire a first stitching pattern video image including an image of a stitching pattern appearing on the front face of the cloth, the image of the stitching pattern being at a center position of the first stitching pattern video image;
   performing image acquisition by the second image acquisition unit from a back face side of the cloth, so as to acquire a second stitching pattern video image including a part of the back face side corresponding to the stitching pattern appearing on the front face of the cloth, the part being at a center position of the second stitching pattern video image; and
   displaying, on a single screen, by the display unit, the first stitching pattern video image thus acquired by the first image acquisition unit and the second stitching pattern video image thus acquired by the second image acquisition unit.

14. A non-transitory recording medium configured to store a program for instructing a sewing machine to execute a stitching pattern display method employed by the sewing machine, comprising a first image acquisition unit, a second image acquisition unit, and a display unit, wherein the stitching pattern display method comprises:
   performing image acquisition by the first image acquisition unit from a front face side of a cloth, so as to acquire a first stitching pattern video image including an image of a stitching pattern appearing on the front face of the cloth, the image of the stitching pattern being at a center position of the first stitching pattern video image;

performing image acquisition by the second image acquisition unit from a back face side of the cloth, so as to acquire a second stitching pattern video image including a part of the back face side corresponding to the stitching pattern appearing on the front face of the cloth, the part being at a center position of the second stitching pattern video image; and displaying, on a single screen, by the display unit, the first stitching pattern video image thus acquired by the first image acquisition unit and the second stitching pattern video image thus acquired by the second image acquisition unit.

\* \* \* \* \*